(12) United States Patent
Soriano

(10) Patent No.: US 9,667,838 B1
(45) Date of Patent: May 30, 2017

(54) SYSTEM AND METHOD TO ENSURE UNIFORM LEVEL OF COLOR OF A DISTRIBUTED PRINT JOB AMONG MULTIPLE PRINTERS IN A PRINT SHOP SYSTEM

(71) Applicant: Konica Minolta Laboratory U.S.A., Inc., San Mateo, CA (US)

(72) Inventor: Randy Cruz Soriano, San Leandro, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/982,637

(22) Filed: Dec. 29, 2015

(51) Int. Cl.
| H04N 1/60 | (2006.01) |
| H04N 1/32 | (2006.01) |
| H04N 1/00 | (2006.01) |
| G06F 3/12 | (2006.01) |
| G06K 15/02 | (2006.01) |

(52) U.S. Cl.
CPC ........... *H04N 1/6055* (2013.01); *G06F 3/126* (2013.01); *G06F 3/1208* (2013.01); *G06F 3/1241* (2013.01); *G06F 3/1261* (2013.01); *G06F 3/1288* (2013.01); *G06K 15/027* (2013.01); *G06K 15/1859* (2013.01); *G06K 15/1878* (2013.01); *H04N 1/00023* (2013.01); *H04N 1/00034* (2013.01); *H04N 1/00045* (2013.01); *H04N 1/00061* (2013.01); *H04N 1/00079* (2013.01); *H04N 1/3255* (2013.01); *H04N 1/32545* (2013.01); *H04N 1/32555* (2013.01); *H04N 1/6033* (2013.01); *H04N 2201/0094* (2013.01)

(58) Field of Classification Search
None
See application file for complete search history.

(56) References Cited

U.S. PATENT DOCUMENTS

| 5,859,711 | A | * | 1/1999 | Barry | ..................... | B41J 29/393 |
| | | | | | | 358/1.15 |
| 6,035,103 | A | * | 3/2000 | Zuber | ................... | G06F 3/1211 |
| | | | | | | 358/1.9 |
| 6,707,563 | B1 | * | 3/2004 | Barry | ...................... | G06F 3/121 |
| | | | | | | 358/1.14 |
| 6,856,416 | B1 | * | 2/2005 | Danknick | ............. | G06F 3/1204 |
| | | | | | | 358/1.14 |
| 7,046,391 | B1 | * | 5/2006 | Barry | ................. | G03G 15/5087 |
| | | | | | | 358/1.9 |

(Continued)

*Primary Examiner* — Scott A Rogers
(74) *Attorney, Agent, or Firm* — Buchanan Ingersoll & Rooney PC

(57) ABSTRACT

A server, a system, a method, and a computer readable medium are disclosed, which includes a server which is configured to be connected to a plurality of printers, each of the plurality of printers configured to conduct color calibration based on a first criterion, and wherein the server includes a processor configured to: receive a print job; determine whether the received print job is a split job which can be split into at least two printers among the plurality of the printers; and instruct, in response to receiving the split job, to the at least two printers that color calibration is conducted based on a second criterion, wherein the second criterion causes color calibration at each of the at least two printer to be performed earlier than the first criterion.

20 Claims, 17 Drawing Sheets

(56) References Cited

U.S. PATENT DOCUMENTS

| | | | | |
|---|---|---|---|---|
| 7,352,491 B2* | 4/2008 | Bala | ............... | H04N 1/603 358/2.1 |
| 7,489,422 B2* | 2/2009 | Zuber | ............... | B41J 29/393 358/1.9 |
| 7,532,347 B2* | 5/2009 | Barry | ............... | B41J 29/393 358/1.13 |
| 7,639,381 B2* | 12/2009 | Shima | ............... | H04N 1/32545 358/1.1 |
| 7,791,777 B2* | 9/2010 | Barry | ............... | B41J 29/393 345/502 |
| 8,014,024 B2* | 9/2011 | Viturro | ............... | H04N 1/6055 358/1.9 |
| 8,072,633 B2* | 12/2011 | Fujimori | ............... | G06F 3/1208 358/1.15 |
| 8,120,812 B2* | 2/2012 | Sharma | ............... | H04N 1/603 347/19 |
| 8,368,951 B2* | 2/2013 | Hayase | ............... | G06F 3/1209 358/1.9 |
| 8,584,137 B2* | 11/2013 | Yamauchi | ............... | G06F 9/5011 718/106 |
| 8,867,081 B2* | 10/2014 | Soriano | ............... | G06K 15/1803 358/1.15 |
| 2008/0063413 A1* | 3/2008 | Zuber | ............... | B41J 29/393 399/15 |
| 2008/0151281 A1* | 6/2008 | Barry | ............... | G03G 15/5087 358/1.9 |

* cited by examiner

Fig. 5 Exterior appearance of Printer

|  | Second criteria | First criteria |
|---|---|---|
| Printer 1 | 600 | 1000 |
| Printer 2 | 1200 | 2000 |
| Printer 3 | 300 | 500 |
| Printer 4 | 480 | 800 |
| Printer 5 | 600 | 1000 |
| Printer 6 | 1800 | 3000 |
| Printer 7 | 300 | 500 |
| Printer 8 | 600 | 1000 |

Fig. 11 print Queue

| Job-ID | Split | Status |
|---|---|---|
| Job3 | No | wait |
| Job2 | No | executing |
| Job1 | No | executing |

Each printer independently conducts calibration based on the first criteria correlated with the printer because no split job is registered in a print queue.

print Queue

| Job-ID | Split | Status |
|---|---|---|
| Job4 | Yes | wait |
| Job3 | No | executing |
| Job2 | No | executing |
| Job1 | No | executing |

Each printer conducts calibration pursuant to an instruction sent from a server because a split job (Job4) is registered in a print queue.

print Queue

| Job-ID | Split | Status |
|---|---|---|
| Job7 | Yes | wait |
| Job6 | No | wait |
| Job5 | No | executing |
| Job4 | Yes | executing |

Each printer conducts calibration pursuant to an instruction sent from a server because a split job (Job4) is registered in a print queue.

print Queue

| Job-ID | Split | Status |
|---|---|---|
| Job10 | No | wait |
| Job9 | No | executing |
| Job8 | No | executing |

Each printer independently conducts calibration based on the first criteria because no split job is registered in a print queue.

Fig. 13

| Print Job | | | | | | |
|---|---|---|---|---|---|---|
| | Job Properties | | | | | |
| Job Id | Number of pages | Number of copies | Job Split | Color | Media | Finishing |
| 1 | 100 | 20 | Yes | color | 11in x 17in<br>8.5in x 11in | fold<br>staple |

| Print Job | | | | | | |
|---|---|---|---|---|---|---|
| | Job Properties | | | | | |
| Job Id | Number of pages | Number of copies | Job Split | Color | Media | Finishing |
| 2 | 50 | 30 | Yes | color | A4 | staple |

FIG. 15A

Print Device / Device Information

| Device Id | Status | Color | Media | Finisher | Engine Print Speed (pages/min) | Remaining Paper count |
|---|---|---|---|---|---|---|
| Printer1 | Waiting | color | ok | ok | 100 | 850 |
| Printer2 | Waiting | color | ok | ok | 150 | 2000 |
| Printer3 | Waiting | color | ok | ok | 50 | 500 |
| Printer4 | Waiting | color | ok | ok | 80 | 450 |
| Printer5 | Waiting | color | ok | ok | 100 | 440 |
| Printer6 | Waiting | b/w | | | | |
| Printer7 | Executing | | | | | |
| Printer8 | Error | | | | | |

Print Device / Device Information

| Device Id | Status | Color | Media | Finisher | Engine Print Speed (pages/min) | Remaining Paper count |
|---|---|---|---|---|---|---|
| Printer1 | Waiting | color | ok | ok | 100 | 450 |
| Printer2 | Waiting | color | ok | ok | 150 | 1300 |
| Printer3 | Waiting | color | ok | ok | 50 | 300 |
| Printer4 | Waiting | color | ok | ok | 80 | 150 |
| Printer5 | Waiting | color | ng | | | |
| Printer6 | Waiting | b/w | | | | |
| Printer7 | Waiting | color | ok | ok | 50 | |
| Printer8 | Error | | | | | |

FIG. 15B

| Meet Job Criteria | Assign Job split id | Job split distribution | Estimated Print Completion (second) |
|---|---|---|---|
| yes | 1-1 | 400 | 240.00 |
| yes | 1-2 | 700 | 280.00 |
| yes | 1-3 | 200 | 240.00 |
| yes | 1-4 | 300 | 225.00 |
| no | 1-5 | 400 | 240.00 |
| no | | | |
| | | Total Print time | 280.00 |

| Meet Job Criteria | Assign Job split id | Job split distribution | Estimated Print Completion (second) |
|---|---|---|---|
| yes | 2-1 | 400 | 240.00 |
| yes | 2-2 | 600 | 240.00 |
| yes | 2-3 | 200 | 240.00 |
| yes | 2-4 | 150 | 112.50 |
| no | | | |
| no | | | |
| yes | 1-5 | 150 | 180.00 |
| | | Total Print time | 240.00 |

FIG. 15C

SYSTEM AND METHOD TO ENSURE UNIFORM LEVEL OF COLOR OF A DISTRIBUTED PRINT JOB AMONG MULTIPLE PRINTERS IN A PRINT SHOP SYSTEM

FIELD OF THE INVENTION

The present disclosure relates to a system and method to ensure uniform level of color of distributed print jobs among multiple printers or a plurality of printers in a print shop system, and more particularly to a split job wherein a color calibration cycle of target printers is shortened when a split print job is received by a printer server and registered in the print queue of the printer server.

BACKGROUND OF THE INVENTION

In order to optimize overall the print shop capacity, a print job can be split among multiple printers. However, color reproduction may not be consistent throughout the targeted printing devices.

Generally, a printing device is calibrated to operate at an ideal level for producing consistent output based on many parameters such as toner life, imaging unit life, temperature, humidity, etc. The problem is each printer may print at different color level due to the printers might have different level of print usage. Some printers may start deviating from the ideal color level due to large volume prints, higher toner consumptions due to high saturation of color required by the print document while some that are lightly utilized the color quality still at good level.

When a printer starts deviating from its ideal color level (or target color level), color correction can be performed either by automatic or manual calibration if the printer requires further action to make the color consistent among each of the plurality of printers. Employing calibration can be predetermined in a printer where parameters condition set its threshold or limits in which color reproduction consistency can no longer guarantee. For example, the threshold or limits can be where a printer reaches certain volume of prints (or copies), an amount of toner consumed, or imaging unit service life.

Although the printer performs its color calibration, it can only guarantee consistent color reproduction within its output and may not be consistent among other printers. Therefore, a system is proposed that can analyze conditions throughout a plurality of printers to determine the best options, and which shorten the time calibration cycle of the target printers when a job is split into two or more print jobs.

SUMMARY OF THE INVENTION

In consideration of the above issues, it would be desirable to have a system and method that uses the received print job information to determine the process to take for the target printers to perform calibration before printing a split job to keep color consistency throughout.

A server is disclosed which is configured to be connected to a plurality of printers, each of the plurality of printers configured to conduct color calibration based on a first criterion, the server comprising: a processor configured to: receive a print job; determine whether the received print job is a split job which can be split into at least two printers among the plurality of the printers; and instruct, in response to receiving the split job, to the at least two printers that color calibration is conducted based on a second criterion, wherein the second criterion causes color calibration at each of the at least two printer to be performed earlier than the first criterion.

A system is disclosed for ensuring uniform level of color of distributed print jobs among a plurality of printers in a print shop system, the system comprising: at least two printer, each of the at least two printer comprising: a sensing device configured to read a color validation chart, the color validation chart having one or more color patches; and a processor configured to: acquire a validation result on a color validation chart from the sensing device, wherein the validation result compares a color accuracy of each of the one or more color patches from the color validation chart to a target color; calculate a difference between the color validation chart and the target color; and calibrate the printer based on the difference between the color validation chart and the target color; and a server which is connected to the plurality of printers, and wherein each of the plurality of printers configured to conduct color calibration based on a first criterion, the server comprising: a processor configured to: receive a print job; determine whether the received print job is a split job which can be split into at least two printers among the plurality of the printers; and instruct, in response to receiving the split job, to the at least two printers that color calibration is conducted based on a second criterion, wherein the second criterion causes color calibration at each of the at least two printer to be performed earlier than the first criterion.

A method is disclosed for ensuring uniform level of color of distributed print jobs among a plurality of printers in a print shop system, the method comprising: connecting a server to a plurality of printers, each of the plurality of printers configured to conduct color calibration based on a first criterion; receiving a print job on the server; determining whether the received print job is a split job which can be split into at least two printers among the plurality of the printers; and instructing, in response to receiving the split job, to the at least two printers that color calibration is conducted based on a second criterion, wherein the second criterion causes color calibration at each of the at least two printer to be performed earlier than the first criterion.

A non-transitory computer readable recording medium stored with a computer readable program code is disclosed for ensuring uniform level of color of distributed print jobs among a plurality of printers in a print shop system, wherein a server is configured to be connected to a plurality of printers, each of the plurality of printers configured to conduct color calibration based on a first criterion, the computer readable program code configured to execute a process comprising: receiving a print job on the server; determining whether the received print job is a split job which can be split into at least two printers among the plurality of the printers; and instructing, in response to receiving the split job, to the at least two printers that color calibration is conducted based on a second criterion, wherein the second criterion causes color calibration at each of the at least two printer to be performed earlier than the first criterion.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 11 is a second criteria table in accordance with an exemplary embodiment.

FIG. 13 is a diagram showing print queues of a server in accordance with an exemplary embodiment.

FIGS. 15A-15C is a chart showing print jobs in accordance with an exemplary embodiment.

DETAILED DESCRIPTION

Figure 1:
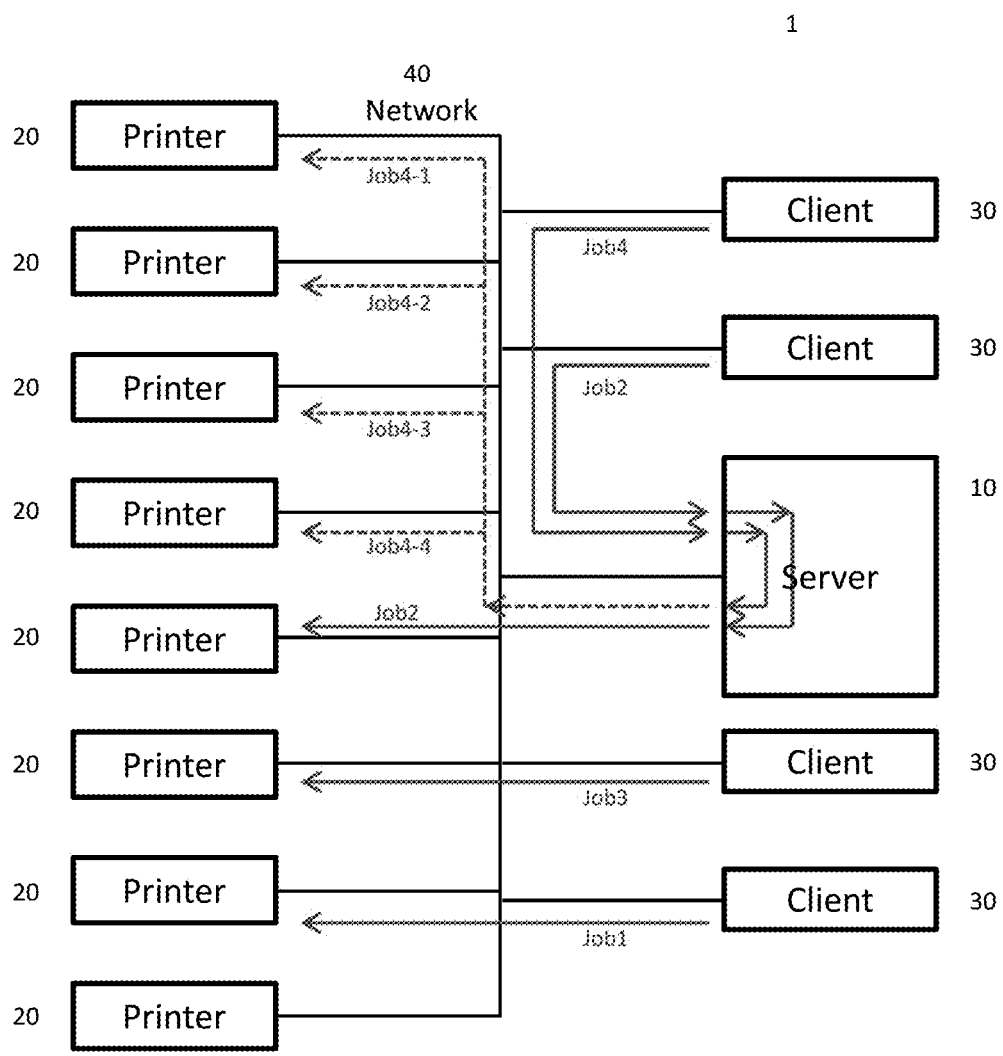
FIG. 1 is a diagram of an exemplary system to help ensure uniform level of color of distributed print job among multiple printers in a print shop system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method is disclosed, which can help ensure uniform level of color reproduction of print jobs, which are split among multiple or a plurality of printers, and more particularly, relates to a split job wherein a calibration cycle of target printers is shortened when a split print job is received by a printer server and registered in the print queue of the server.

FIG. 1 is a diagram of a system 1 to help ensure uniform level of color of distributed print job among multiple printers 20 in a print shop system in accordance with an exemplary embodiment. As shown in FIG. 1, the system 1 can include at least one server 10, a plurality of printing devices 20, and one or more client devices 30. In accordance with an exemplary embodiment, the server 10 can be configured to acquire device capabilities and color information from each of the plurality of printing devices 20 and can use the information to invoke color calibration before printing the split job.

In accordance with an exemplary embodiment, a print job can be received by the server 10 from one or more client devices 30. In accordance with an exemplary embodiment, based on print job information, for example, a threshold job property value can be set, which must be met in order for the job to be split (for example, Job4). For example, the threshold job property value can based on a total page count (for example, the number of pages and number of copies) required for completion of the print job. Additional considerations can include, for example, identifying each target printing device, for instance, a color print job requires color printers, and finish accessories associated with each of the one or more printers 20, for example, capabilities, such as stapling, punching, and/or folding. Alternatively, it can be determined that the job is not to be split and can be send either directly to a printer 20 (for example, Job1 and Job3), or determined by the server 10 that the job is to be printed by one of the plurality of printers 22 (for example, Job2).

In accordance with an exemplary embodiment, the server 10 can obtain information to determine the color quality state of each of the one or more of the plurality of printers, which can be used to print the print job and performing a color calibration, for example, such that each printer can guarantee color consistency by itself for a specified number of sheets, for example, for every 1000 printed sheet after the color calibration. However, when a plurality of printers 20 is used for a job split (i.e., wherein a print job is split among two or more printers 20), the color consistency can be guaranteed, for example, for every 600 printed sheets after the color calibration. In accordance with an exemplary embodiment, the present disclosure can help ensure that the calibration cycle of the target printers can be executed immediately once a split job is identified.

Figure 2:
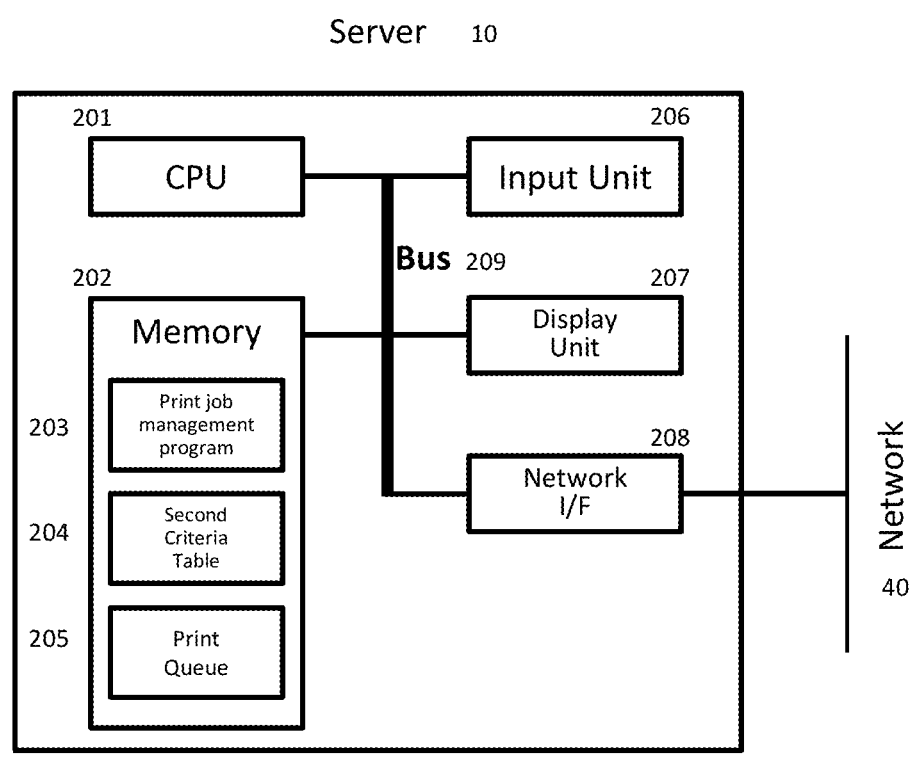
FIG. 2 is a diagram of an exemplary printer server (or server) for use with the system as shown in FIG. 1.

FIG. 2 is a diagram of an exemplary server 10 for use with the system 1 as shown in FIG. 1. As shown in FIG. 2, the server 10 can include a processor or central processing unit (CPU) 201, and one or more memories 202 for storing software programs and data (such as files to be printed). For example, the software programs can include a print job management program 203, a second criteria table 204, and a print queue 205. The processor or CPU carries out the instructions of a computer program, which operates and/or controls at least a portion of the functionality of the server 10. The server 10 can also include an input unit 206, a display unit or graphical user interface (GUI) 207, and a network interface (I/F) 208, which is connected to a communication network (or network) 40. A bus 209 can connect the various components 201, 202, 206, 207, and 208 within the server 10. The server 10 can also include an operating system (OS), which manages the computer hardware and provides common services for efficient execution of various software programs.

In accordance with an exemplary embodiment, the network 40 can be a public telecommunication line and/or a network (for example, LAN or WAN) 40. Examples of the communication network 40 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Figure 3:
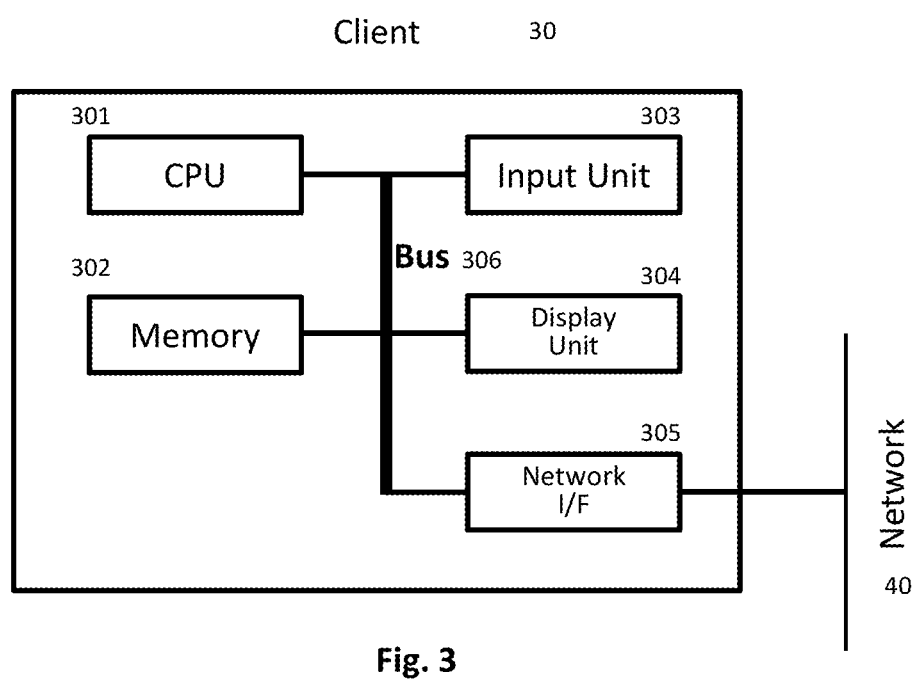
FIG. 3 is a diagram of an exemplary client device for use with the system as shown in FIG. 1.

FIG. 3 is a diagram of an exemplary client device 30 for use with the system 1 as shown in FIG. 1. As shown in FIG.

3, the client device 30 can include a processor or central processing unit (CPU) 301, and one or more memories 302 for storing software programs and data (such as files to be printed). The processor or CPU carries out the instructions of a computer program, which operates and/or controls at least a portion of the functionality of the client device 30. The client device 30 can also include an input unit 303, a display unit or graphical user interface (GUI) 304, and a network interface (I/F) 305, which is connected to a communication network (or network) 40. A bus 306 can connect the various components 301, 302, 303, 304, 305 within the client device 30.

The client device 30 includes an operating system (OS), which manages the computer hardware and provides common services for efficient execution of various software programs. The software programs can include, for example, application software and printer driver software. For example, the printer driver software controls a multifunction printer or printer, for example connected with the client device 30 in which the printer driver software is installed via a communication network 40. In certain embodiments, the printer driver software can produce a print job and/or document based on an image and/or document data. In addition, the printer driver software can control transmission of the print job from the client device 30 to the plurality of printers 20.

Figure 4:
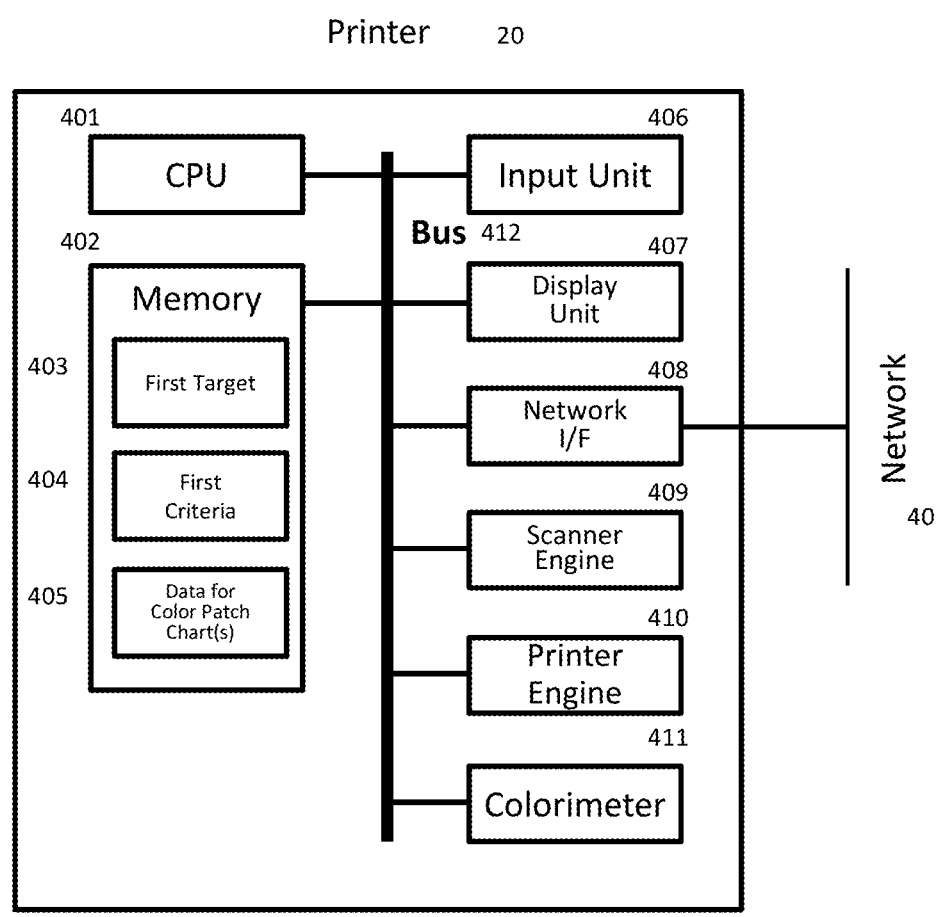
FIG. 4 is a diagram of an exemplary printer or image forming apparatus for use with the system as shown in FIG. 1.

FIG. 4 is a diagram of an exemplary printer or image forming apparatus 20 for use with the system 1 as shown in FIG. 1. As shown in FIG. 4, the printer 20 can include a processor or central processing unit (CPU) 401, and one or more memories 402 for storing software programs and data (such as files to be printed). For example, the software programs can include a first target 403, a first criteria 404, and data for color patch chart(s) 405. The processor or CPU carries out the instructions of a computer program, which operates and/or controls at least a portion of the functionality of the printer 20. The printer 20 can also include an input unit 406, a display unit or graphical user interface (GUI) 407, and a network interface (I/F) 408, which is connected to a communication network (or network) 40, a scanner engine 409, a printer engine 410, and a colorimeter 411. In accordance with an exemplary embodiment, for example, the colorimeter 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 412 can connect the various components 401, 402, 406, 407, 408, 409, 410, 411 within the printer 20. The printer 20 also includes an operating system (OS), which manages the computer hardware and provides common services for efficient execution of various software programs In accordance with an exemplary embodiment, it can be within the scope of the disclosure for the printer 20 to be a copier. The printer or print engine 410 has access to a print media (not shown) of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

For example, in accordance with an exemplary embodiment, an image processing section within the printer 20 can carry out various image processing under the control of a print controller or CPU 401, and sends the processed print image data to the print engine 410. The image processing section can also include a scanner section for optically reading a document, such as an image recognition system. The scanner section receives the image from the scanner and converts the image into a digital image. The print engine 410 forms an image on a recording sheet based on the image data sent from the image processing section. The central processing unit (CPU) (or processor) 401 and the memory 402 can include a program for RIP processing (Raster Image Processing), which is a process for converting print data included in a print job into Raster Image data to be used in the printer or print engine 410. The CPU 401 can include a printer controller configured to process the data and job information received from the one or more client devices (not shown), for example, received via the network connection unit and/or input/output section (I/O section) 408.

The CPU 401 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client devices (not shown) to generate a print image.

The network I/F 408 performs data transfer with the server 10 or client device 30. The printer controller can be programmed to process data and control various other components of the multi-function peripheral to carry out the various methods described herein. In accordance with an exemplary embodiment, the operation of printer section commences when it receives a page description from the one or more client devices (not shown) via the network I/F 408 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 20 consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the color calibration of each of the plurality printers 20 as shown in FIG. 1 can be performed by creating a color test pattern, for example, on the print controller of the CPU 401, which can be, for example, a Digital Front End (DFE) printer controller that can be set based on one or more print conditions, for example, after a specific number of print copies have been printed by the image forming apparatus or printer 20. With the calibration setting enabled, the color measurement pages can be printed, and the one or more printed color patches to a corresponding target color for each of the one or more printed color patches. The color calibration patch compared to the target color (or target color data) can determine the color rendering performance of print engine of the image forming apparatus or printer 20.

In accordance with an exemplary embodiment, the printer 20 can have a color calibration setting, which checks the printed colors of the one or more color chart(s) (or measurement page(s)), each of the one or more color chart(s) (or measurement page(s)) having a plurality of color patches with a target color for each of the one or more color patches. The color calibration setting can be enabled on the image forming apparatus, for example, when a predetermined number of sheets or pages have been printed by the printer or image forming apparatus 20. In addition, the color calibration setting can be enabled after a preset time or period, for example, after servicing of the printer 20.

Figure 5:
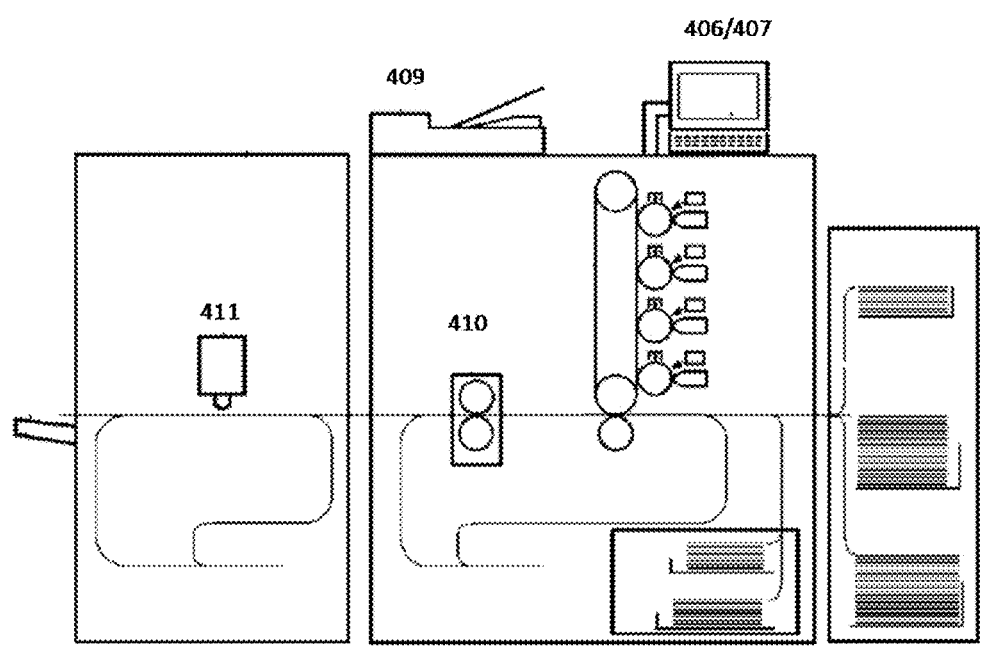
FIG. 5 is an illustration of a printer or image forming apparatus in accordance with an exemplary embodiment.

FIG. 5 is an illustration of a printer 20 in accordance with an exemplary embodiment. As shown in FIG. 5, the printer 20 includes the input unit 406, the display unit or graphical user interface (GUI) 407, the scanner engine 409, the printer engine 410, and the colorimeter 411. In accordance with an exemplary embodiment, for example, the colorimeter 411 can be one or more color sensors or colorimeters, such as an RGB scanner, a spectral scanner with a photo detector or other such sensing device known in the art, which can be embedded in the printed paper path.

Figure 6:
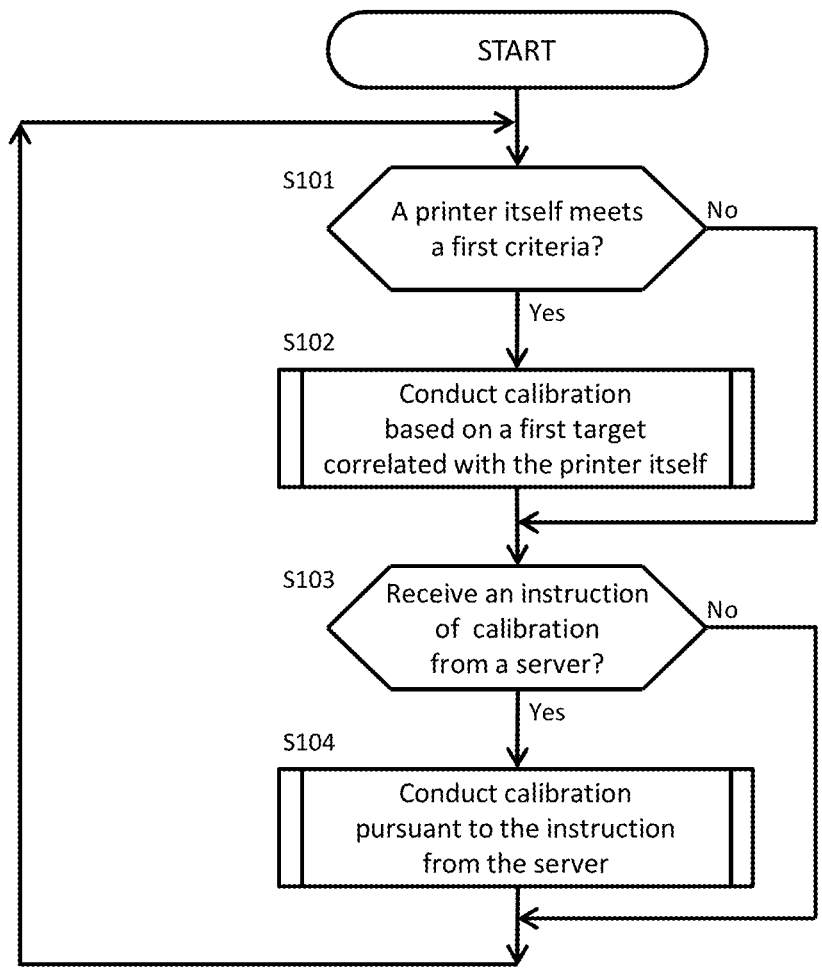
FIG. 6 is flow chart illustrating a process for each of the plurality of printers in accordance with an exemplary embodiment.

FIG. 6 is flow chart illustrating a process for each of the plurality of printers 20 in accordance with an exemplary embodiment. As shown in FIG. 6, the process starts in step S101, where a determination is made if the printer 20 meets a first criteria. In accordance with an exemplary embodiment, for example, the first criteria can be that a printer can guarantee color consistency for a specified number of sheets, for example, for every 1000 printed sheet after color calibration. If the printer 20 does not meet the first criteria, the process continues to step S103, where a determination is made, if an instruction from the server 10 has been received to calibrate the printer 20. Alternatively, if the printer does meet the first criteria, the process continues to step S102, where a color calibration is conducted on the printer 20 based on a first target (or first target color) correlated with the printer itself. In step S103, if the printer 20 does not receive an instruction from the server 10 to perform a color calibration, the process returns to step S101. Alternatively, if the printer 20 receives an instruction from the server 10 to perform a color calibration, in step S104, a color calibration is conducted pursuant to the instructions received from the server 10.

Figure 7:
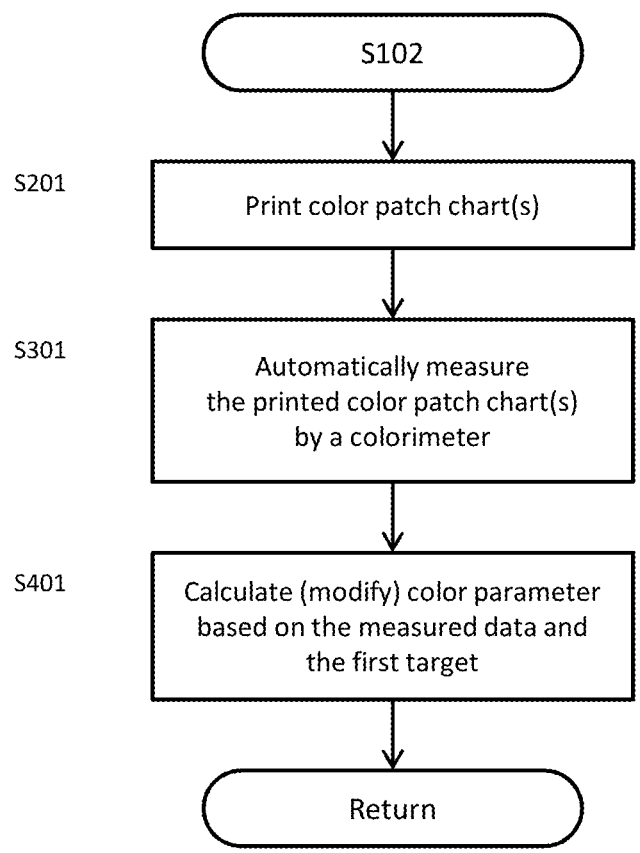
FIG. 7 is a flow chart illustrating a process of conducting calibration based on a first target correlated with the printer in accordance with an exemplary embodiment.

FIG. 7 is a flow chart illustrating a process of conducting color calibration 102 based on a first target correlated with the printer 20 in accordance with an exemplary embodiment. As shown in FIG. 7, the color calibration process S102 starts in step S210, where the color patch chart(s) (or measurement sheets) having a plurality of color patches (or calibration print stripes) is printed. In step S301, the color patch chart(s) are preferably read by an inline measuring device or colorimeter 411. The inline measuring device or colorimeter 411, for example, can be one or more inline color sensors (not shown), which are located in the paper path, and which feeds information to the CPU 401 for processing. The information received by the CPU (or processor) 401 from the measuring device or colorimeter 411 can be used to calculate or modified the color parameters of the printer 20. In step S401, the color parameters of the printer 20 can be calculated or modified based on the measured data and the first target.

Figure 8:
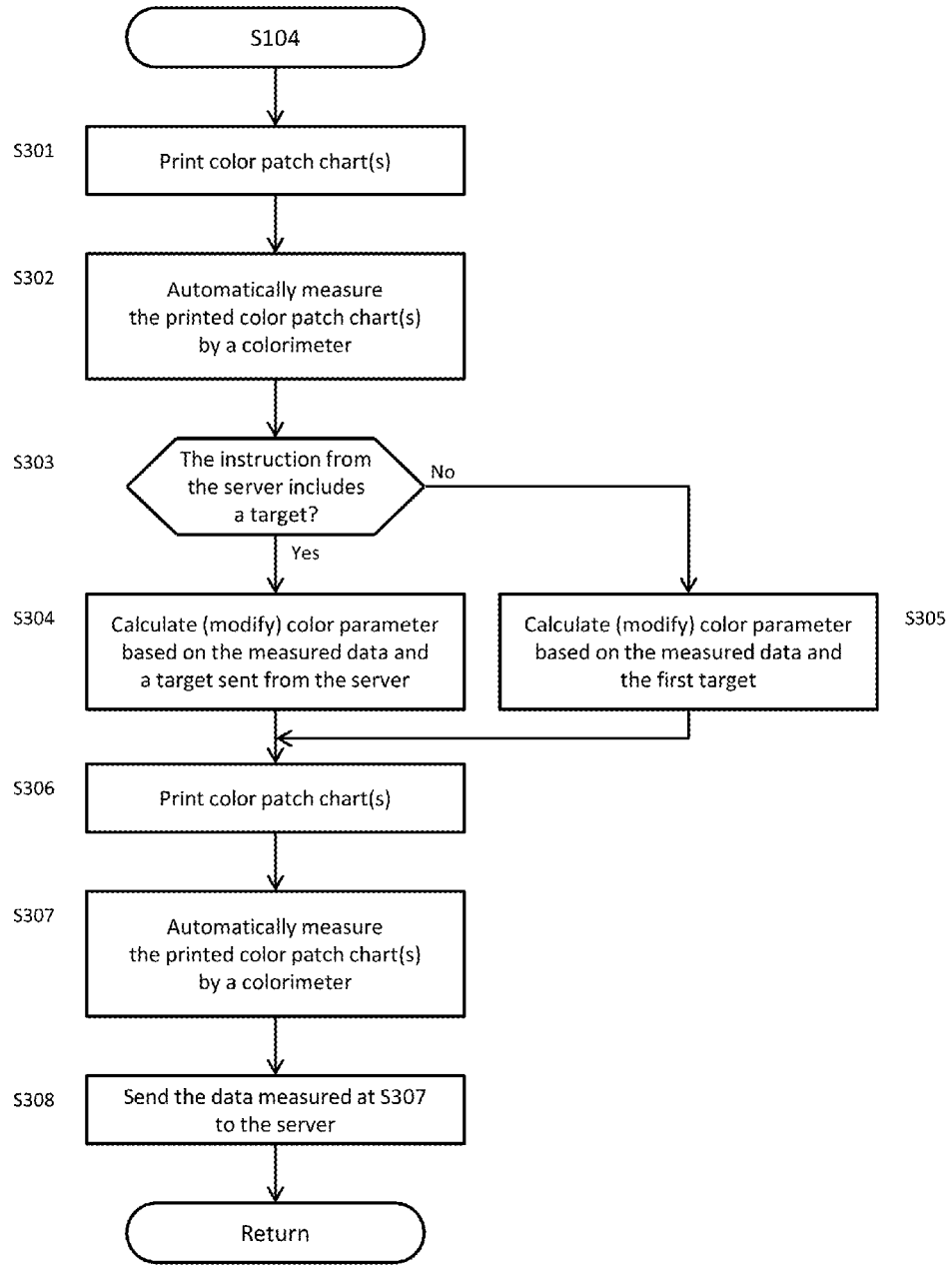
FIG. 8 is a flow chart illustrating a process of conducting calibration pursuant to an instruction received from the server.

FIG. 8 is a flow chart illustrating a process of conducting calibration S104 pursuant to an instruction received from the server 10. As shown in FIG. 8, in step S301, the color patch chart(s) (or measurement sheets) are printed. In step S302, the printed color patch chart(s) are automatically measured by the colorimeter 411. In step S303, a determination is made if the instructions from the server 10 include a target. If the instructions do not include a target (i.e., "no"), the process continues to step S305, where the color parameters of the printer 20 are calculated and/or modified based on the measured data and the first target. If the instructions do include a target, in step S304, the color parameters of the printer are calculated and/or modified based on the measured data and a target sent from the server 10. The process continues to step S306, where the color patch chart(s) are printed. In step S307, the printed color patch chart(s) are automatically measured by the colorimeter. In step S308, the data measured on the printed color patch(s) in step S307 is sent to the server 10.

Figure 9:
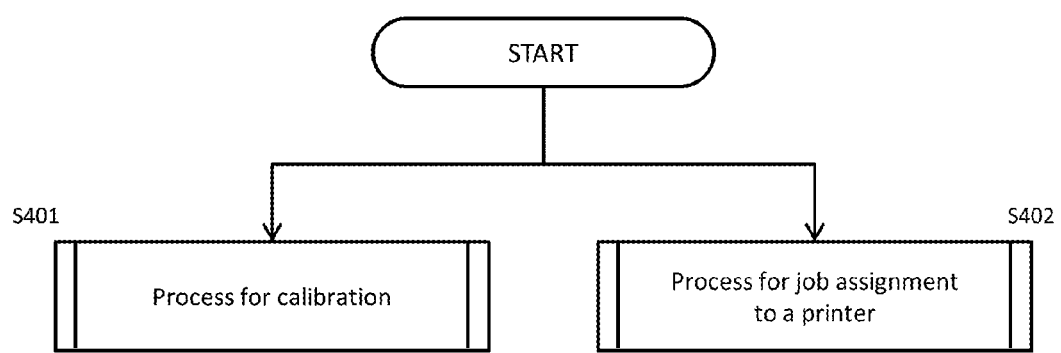
FIG. 9 is a flow chart illustrating a process performed by the server for calibration and job assignment to a printer in accordance with an exemplary embodiment.

FIG. 9 is a flow chart illustrating a process performed by the server 10 for calibration and job assignment to at least one printer 20 in accordance with an exemplary embodiment. As shown in FIG. 9, the process starts and proceeds to step S401 for calibration of a printer 20 or step S402 for a job assignment to a printer 20.

Figure 10:
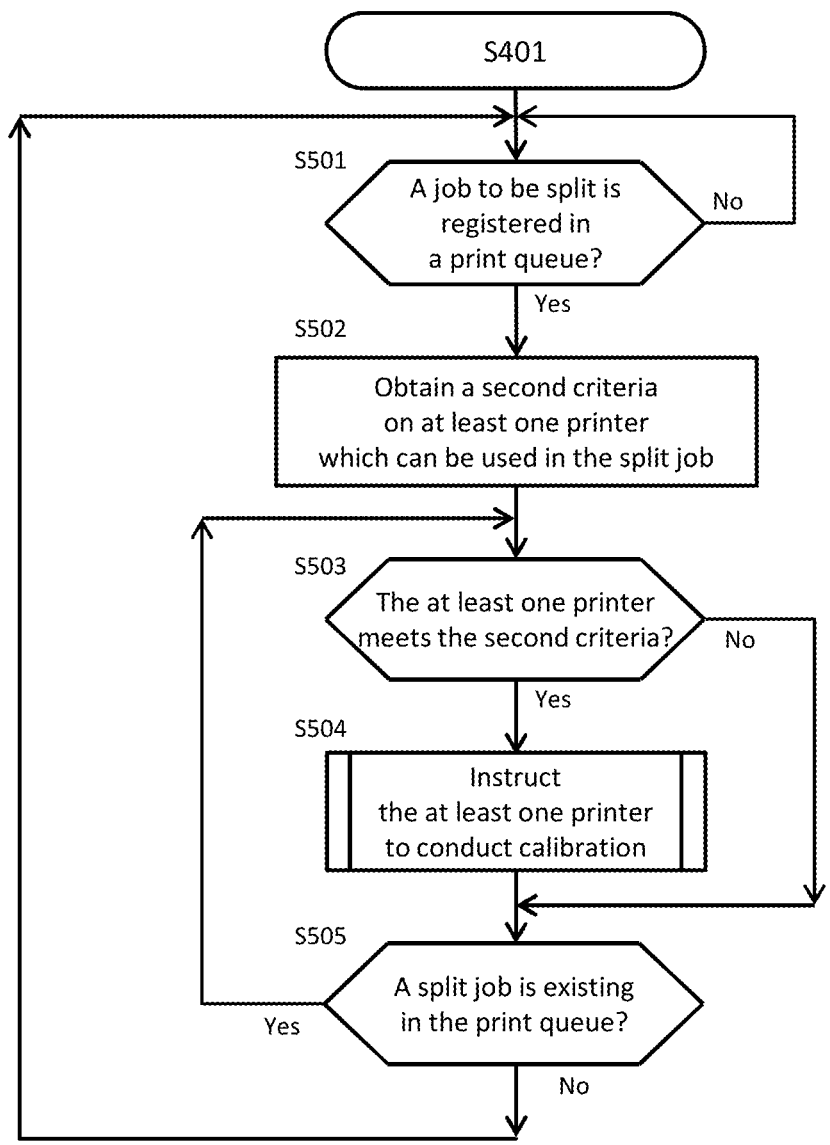
FIG. 10 is a flow chart illustrating a process for calibration of a printer in accordance with an exemplary embodiment.

FIG. 10 is a flow chart illustrating a process for calibration of a printer (step S401) in accordance with an exemplary embodiment. As shown in FIG. 10, in step S501, a determination is made if the job registered in the print queue of the server 10 is a job that could be split. If the job could not be split, the process returns to the start. If the job could be split, in step S502, a second criteria on at least one printer 20, which can be used for the split job is obtained. In step S503, a determination is made if the at least one printer 20 meets the second criteria. For example, in accordance with an exemplary embodiment, the second criteria is a print count or a time period after conducting a prior color calibration. If the at least one printer 20 does not meet the second criteria, the process continues to step S505, where a determination is made if a split job is still existing in the print queue of the server 10. If the at least one printer 20 meets the second criteria in step S503, the process proceed to step S504, where the at least one printer 20 is instructed to conduct a color calibration. The process then proceeds to step S505 where a determination is made if there is a split job existing in the print queue of the server 10, the process continues to step S503. If there is no split job existing in the print queue of the server, the process continues to step S501.

FIG. 11 is a second criteria table in accordance with an exemplary embodiment. As shown in FIG. 11, the second criteria table, can include a plurality of printers 20 (Printer 1, Printer 2 . . . Printer 8), a listing of the second criteria and a listing of the first criteria for each of the plurality of printers 20. As shown in FIG. 11, the first and second criteria are in pages printed by each of the plurality of printers 20.

Figure 12:
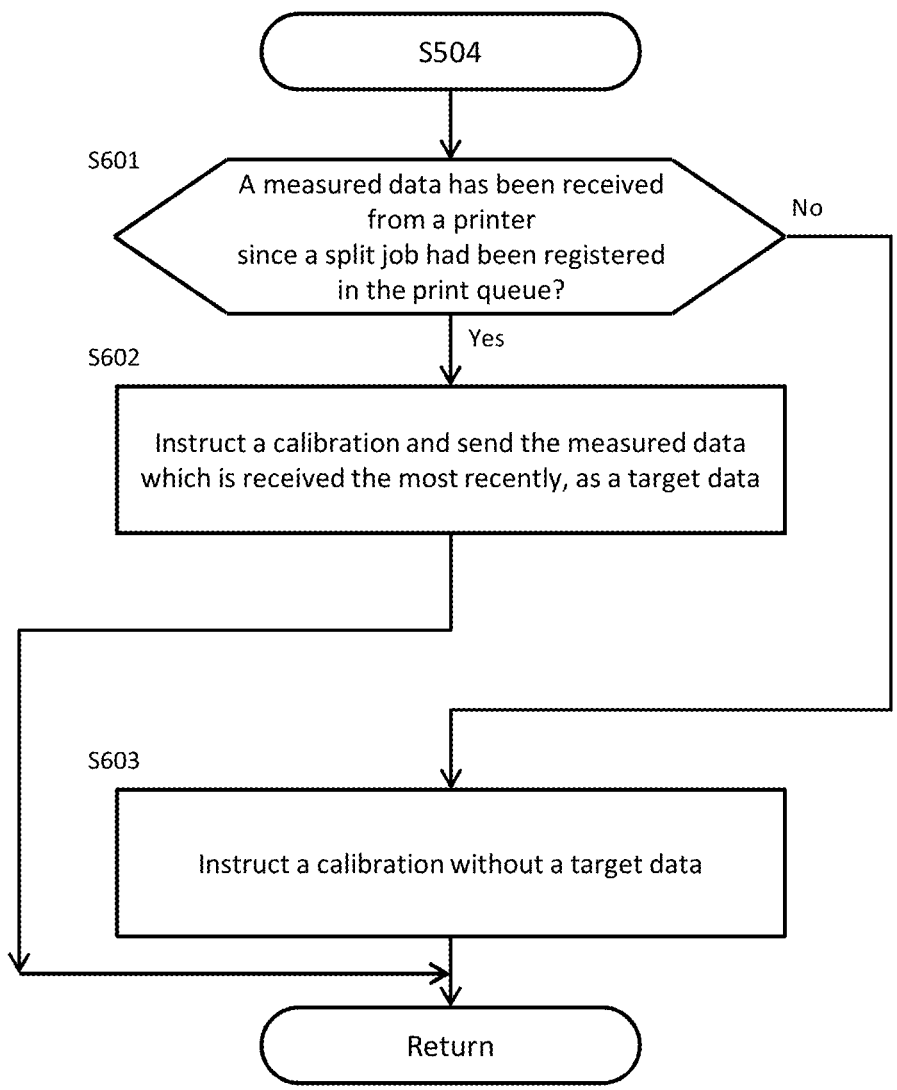
FIG. 12 is a flow chart illustrating a process of instructing at least one printer to conduct calibration.

FIG. 12 is a flow chart illustrating a process of instructing at least one printer to conduct calibration (step S504) in accordance with an exemplary embodiment. As shown in FIG. 12, in step S601, a determination is made, if measured data has been received from a printer 20 since a split job has been registered in the print queue of the server 10. If the answer to step S601 is "no", the process continues to step S603, where the printer 20 is instructed to conduct a calibration without a target data. If the answer to step S601 is "yes", in step S602, the calibration instruction is received, and the measured data, which is received most recently, is sent as the target data.

FIG. 13 is a diagram showing print queues of a server 10 in accordance with an exemplary embodiment. As shown in FIG. 13, in the first example, each printer can independently conduct calibration based on the first criteria correlated with the printer because no split job is registered in a print queue. In the second example, each printer can conduct calibration pursuant to an instruction sent from the server 10 because a split job (Job4) is registered in a print queue. In the third example, each printer conducts calibration pursuant to an instruction received from the server 10 because a split job (Job4) is registered in a print queue. In accordance with an exemplary embodiment, for example, each of the at least two printers can be instructed that color calibration is to be conducted based on the second criterion while the split job is being registered in the print queue or while the split job is being executed by the at least two printers. In the fourth example, each printer can independently conduct calibration based on the first criteria because no split job is registered in a print queue.

Figure 14:
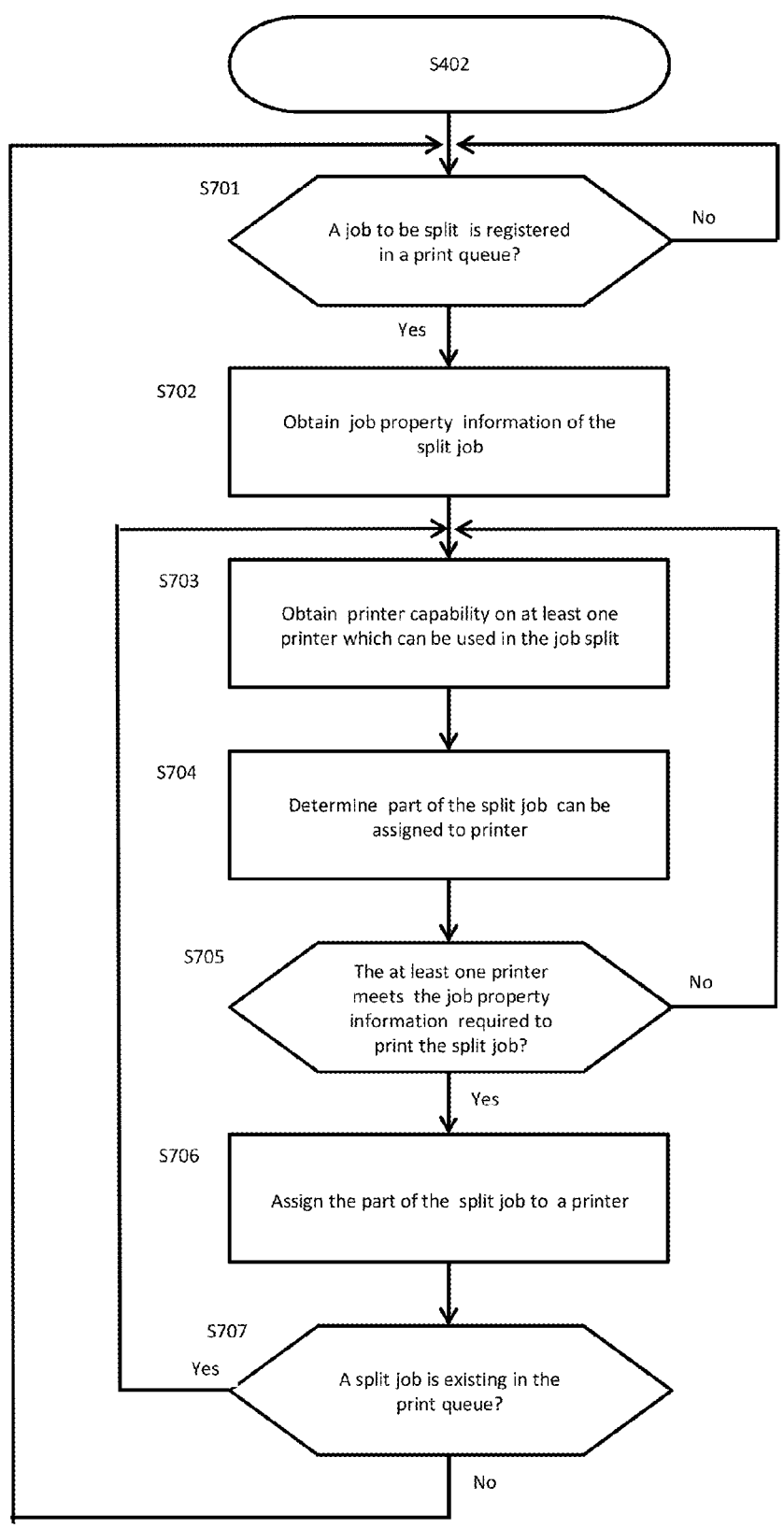
FIG. 14 is a flow chart illustrating a process for job assignment for a split job to a printer in accordance with an exemplary embodiment.

FIG. 14 is a flow chart illustrating a process for job assignment for a split job to a printer (step S402) in accordance with an exemplary embodiment. As shown in FIG. 14, in step S701, a determination is made if a job to be split is registered in a print queue. If the answer is "no", the process returns to start over. However, if the answer in step S701 is "yes", the process continues to step S702, where the job property information of the split job is obtained. In step S703, printer capability on at least one printer which can be used in the job split is obtained. In step S704, a determination is made if part (or a portion) of the split job can be assigned to the printer. In step S705, a determination is made if the at least one printer meets the job property information required to print the split job. If the answer is "no" in step S705, the process returns to step S703. If the answer is "yes" in step S705, the process continues to step S706, where part or a portion of the split job can be assigned to the printer 20. In step S707, a determination can be made if a split job exists in the print queue. If the answer in step S707 is "no", the process returns to step S701. Alternatively, if the answer is "yes", the process returns to step S703.

FIGS. 15A-15C is a chart showing print jobs in accordance with an exemplary embodiment. As shown in FIGS. 15A-15C, for each print job, the corresponding data can include a job id (or job identifier), number of pages, number of copies, whether the job is split job or not, color or black and white (B/W), media, finishing, printer devices (for example, Printer 1, . . . , Printer 8), device information for each of the printers, which can include status, color or black and white (B/W), media, finisher, engine print speed, remaining paper count, does the printer meet the job criteria, assign job split id (identifier), job split distribution, and estimated print completion time.

In accordance with an exemplary embodiment, a non-transitory computer readable recording medium stored with a computer readable program code is disclosed for ensuring uniform level of color of distributed print jobs among a plurality of printers in a print shop system, wherein a server is configured to be connected to a plurality of printers, each of the plurality of printers configured to conduct color calibration based on a first criterion, the computer readable program code configured to execute a process comprising: receiving a print job on the server; determining whether the received print job is a split job which can be split into at least two printers among the plurality of the printers; and instructing, in response to receiving the split job, to the at least two printers that color calibration is conducted based on a second criterion, wherein the second criterion causes color calibration at each of the at least two printer to be performed earlier than the first criterion.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server which is configured to be connected to a plurality of printers, each of the plurality of printers configured to conduct color calibration based on a first criterion, the server comprising:
a processor configured to:
receive a print job;
determine whether the received print job is a split job which can be split into at least two printers among the plurality of the printers;
instruct, in response to receiving the split job, to the at least two printers that color calibration is conducted based on a second criterion, wherein the second criterion causes color calibration at each of the at least two printer to be performed earlier than the first criterion; and
in a case that color calibration has been already conducted based on the second criterion at any of the at least two printers, send a measured data which is measured corresponding to the color calibration conducted based on the second criterion, as a target data, to a printer which is supposed to next conduct color calibration based on the second criterion.

2. The server of claim 1, wherein the processor is configured to:
register the received print job to a print queue; and
instruct that color calibration is conducted based on the second criterion at each of the at least two printers while the split job is being registered in the print queue or the split job is being executed by the at least two printers.

3. The server of claim 1, wherein the processor is configured to:
register the received print job to a print queue; and
instruct that color calibration is conducted based on the second criterion at each of the at least two printers while the split job is being executed by the at the at least two printers.

4. The server of claim 1, wherein each of the plurality of printers conduct color calibration based on a target correlated to each of the plurality of printers when calibration is conducted based on the first criterion.

5. The server of claim 1, wherein the second criterion is a print count or a time period after conducting a prior color calibration.

6. A system for ensuring uniform level of color of distributed print jobs among a plurality of printers in a print shop system, the system comprising:
at least two printer, each of the at least two printer comprising:
a sensing device configured to read a color validation chart, the color validation chart having one or more color patches; and
a processor configured to:
acquire a validation result on a color validation chart from the sensing device, wherein the validation result compares a color accuracy of each of the one or more color patches from the color validation chart to a target color;

calculate a difference between the color validation chart and the target color; and
calibrate the printer based on the difference between the color validation chart and the target color; and
a server which is connected to the plurality of printers, and wherein each of the plurality of printers configured to conduct color calibration based on a first criterion, the server comprising:
a processor configured to:
receive a print job;
determine whether the received print job is a split job which can be split into at least two printers among the plurality of the printers;
instruct, in response to receiving the split job, to the at least two printers that color calibration is conducted based on a second criterion, wherein the second criterion causes color calibration at each of the at least two printer to be performed earlier than the first criterion; and
in a case that color calibration has been already conducted based on the second criterion at any of the at least two printers, send a measured data which is measured corresponding to the color calibration conducted based on the second criterion, as a target data, to a printer which is supposed to next conduct color calibration based on the second criterion.

7. The system of claim 6, comprising:
a client device configured to send the print job to the server, and wherein the processor of the server is configured to:
register the received print job to a print queue; and
instruct that color calibration is conducted based on the second criterion at each of the at least two printers while the split job is being registered in the print queue or the split job is being executed by the at least two printers.

8. The system of claim 7, wherein the processor of the server is configured to:
register the received print job to a print queue; and
instruct that color calibration is conducted based on the second criterion at each of the at least two printers while the split job is being executed by the at the at least two printers.

9. The system of claim 6, wherein each of the plurality of printers conduct color calibration is based on a target correlated to each of the plurality of printers when color calibration is conducted based on the first criterion.

10. The system of claim 6, wherein the second criterion is a print count or a time period after conducting a prior color calibration.

11. A method for ensuring uniform level of color of distributed print jobs among a plurality of printers in a print shop system, the method comprising:
connecting a server to a plurality of printers, each of the plurality of printers configured to conduct color calibration based on a first criterion;
receiving a print job on the server;
determining whether the received print job is a split job which can be split into at least two printers among the plurality of the printers;
instructing, in response to receiving the split job, to the at least two printers that color calibration is conducted based on a second criterion, wherein the second criterion causes color calibration at each of the at least two printer to be performed earlier than the first criterion; and
sending, in a case that color calibration has been already conducted based on the second criterion at any of the at least two printers, a measured data which is measured corresponding to the color calibration conducted based on the second criterion, as a target data, to a printer which is supposed to next conduct color calibration based on the second criterion.

12. The method of claim 11, comprising:
registering the received print job to a print queue of the server; and
instructing that color calibration is conducted based on the second criterion at each of the at least two printers while the split job is being registered in the print queue or the split job is being executed by the at least two printers.

13. The method of claim 11, comprising:
registering the received print job to a print queue of the server; and
instructing that color calibration is conducted based on the second criterion at each of the at least two printers while the split job is being executed by the at the at least two printers.

14. The method of claim 11, comprising:
basing each of the plurality of printers conduct color calibration on a target correlated to each of the plurality of printers when color calibration is conducted based on the first criterion.

15. The method of claim 11, wherein the second criterion is a print count or a time period after conducting a prior color calibration.

16. A non-transitory computer readable recording medium stored with a computer readable program code for ensuring uniform level of color of distributed print jobs among a plurality of printers in a print shop system, wherein a server is configured to be connected to a plurality of printers, each of the plurality of printers configured to conduct color calibration based on a first criterion, the computer readable program code configured to execute a process comprising:
receiving a print job on the server;
determining whether the received print job is a split job which can be split into at least two printers among the plurality of the printers;
instructing, in response to receiving the split job, to the at least two printers that color calibration is conducted based on a second criterion, wherein the second criterion causes color calibration at each of the at least two printer to be performed earlier than the first criterion; and
sending, in a case that color calibration has been already conducted based on the second criterion at any of the at least two printers, a measured data which is measured corresponding to the color calibration conducted based on the second criterion, as a target data, to a printer which is supposed to next conduct color calibration based on the second criterion.

17. The computer readable recording medium of claim 16, comprising:
registering the received print job to a print queue of the server; and
instructing that color calibration is conducted based on the second criterion at each of the at least two printers while the split job is being registered in the print queue or the split job is being executed by the at least two printers.

18. The computer readable recording medium of claim 16, comprising:

registering the received print job to a print queue of the server; and instructing that color calibration is conducted based on the second criterion at each of the at least two printers while the split job is being executed by the at the at least two printers.

19. The computer readable recording medium of claim 16, comprising:

basing each of the plurality of printers conduct color calibration on a target correlated to each of the plurality of printers when color calibration is conducted based on the first criterion.

20. The computer readable recording medium of claim 16, wherein the second criterion is a print count or a time period after conducting a prior color calibration.

\* \* \* \* \*